US008700619B2

(12) United States Patent
Wiegering et al.

(10) Patent No.: US 8,700,619 B2
(45) Date of Patent: Apr. 15, 2014

(54) SYSTEMS AND METHODS FOR PROVIDING CULTURALLY-RELEVANT SEARCH RESULTS TO USERS

(75) Inventors: Anthony Wiegering, Seattle, WA (US); Harmannus Vandermolen, Sunnyvale, CA (US); Karen Howe, Sammamish, WA (US); Michael Sommers, Leesburg, VA (US)

(73) Assignee: AOL Inc., Dulles, VA (US)

( * ) Notice: Subject to any disclaimer, the term of this patent is extended or adjusted under 35 U.S.C. 154(b) by 571 days.

(21) Appl. No.: 12/374,657

(22) PCT Filed: Jul. 20, 2007

(86) PCT No.: PCT/US2007/073999
§ 371 (c)(1),
(2), (4) Date: Jan. 20, 2010

(87) PCT Pub. No.: WO2008/011578
PCT Pub. Date: Jan. 24, 2008

(65) Prior Publication Data
US 2010/0114882 A1    May 6, 2010

Related U.S. Application Data

(63) Continuation of application No. 11/538,729, filed on Oct. 4, 2006, now Pat. No. 7,624,103.

(60) Provisional application No. 60/820,024, filed on Jul. 21, 2006, provisional application No. 60/820,726, filed on Jul. 28, 2006.

(51) Int. Cl.
*G06F 17/30* (2006.01)

(52) U.S. Cl.
USPC ............................ 707/728; 707/729; 707/730

(58) Field of Classification Search
USPC .................. 707/728, 722, 723, 727, 729, 730
See application file for complete search history.

(56) References Cited

U.S. PATENT DOCUMENTS

| 5,751,286 A | 5/1998 | Barber et al. |
| 5,828,839 A | 10/1998 | Moncreiff |
| 5,835,087 A | 11/1998 | Herz et al. |
| 6,049,806 A | 4/2000 | Crecine |

(Continued)

OTHER PUBLICATIONS

Filip Radlinski "Query Chains: Learning to Rank from Implicit Feedback" Aug. 21-24, 2005, Chicago, Illinois, USA.*

(Continued)

*Primary Examiner* — Hosain Alam
*Assistant Examiner* — Ahmed Abraham
(74) *Attorney, Agent, or Firm* — Finnegan, Henderson, Farabow, Garrett & Dunner LLP

(57) ABSTRACT

Search results may be provided to a user. A search query may be received from the user. A query feature vector may be formed for the search query. The query feature vector may be compared with news feature vectors associated with documents related to current events. An augmented query feature vector may be formed based on results of the comparison of the query feature vector with the news feature vectors. The augmented query feature vector may be compared with feature vectors related to target documents. Search results that include target documents may be identified based on results of the comparison of the augmented query feature vector with the feature vectors related to the target documents. The user may be made able to perceive at least some of the identified search results.

31 Claims, 12 Drawing Sheets

(56) References Cited

U.S. PATENT DOCUMENTS

| | | | |
|---|---|---|---|
| 6,112,203 | A | 8/2000 | Bharat et al. |
| 6,385,602 | B1 | 5/2002 | Tso et al. |
| 6,640,218 | B1 | 10/2003 | Golding et al. |
| 6,681,370 | B2 | 1/2004 | Gounares et al. |
| 6,691,106 | B1 | 2/2004 | Sathyanarayan |
| 6,823,370 | B1 | 11/2004 | Kredo et al. |
| 6,901,207 | B1 | 5/2005 | Watkins |
| 6,963,867 | B2 | 11/2005 | Ford et al. |
| 7,209,942 | B1 | 4/2007 | Hori et al. |
| 7,209,952 | B2 | 4/2007 | Fong et al. |
| 7,266,559 | B2* | 9/2007 | Cook et al. ............... 1/1 |
| 7,281,220 | B1 | 10/2007 | Rashkovskiy |
| 7,367,043 | B2 | 4/2008 | Dudkiewicz et al. |
| 7,440,976 | B2 | 10/2008 | Hart et al. |
| 7,519,865 | B1* | 4/2009 | Maly et al. ............ 714/33 |
| 7,599,911 | B2* | 10/2009 | Manber et al. ............ 1/1 |
| 7,624,103 | B2 | 11/2009 | Wiegering et al. |
| 7,624,416 | B1 | 11/2009 | Vandermolen et al. |
| 7,689,682 | B1 | 3/2010 | Eldering et al. |
| 7,783,085 | B2* | 8/2010 | Perlmutter et al. ........... 382/118 |
| 7,783,622 | B1 | 8/2010 | Vandermolen et al. |
| 7,818,646 | B1* | 10/2010 | Maly et al. ............ 714/741 |
| 2002/0069218 | A1* | 6/2002 | Sull et al. ............ 707/501.1 |
| 2002/0082901 | A1 | 6/2002 | Dunning et al. |
| 2002/0133826 | A1 | 9/2002 | Ohyama |
| 2002/0184336 | A1 | 12/2002 | Rising, III |
| 2003/0093790 | A1 | 5/2003 | Logan et al. |
| 2003/0182220 | A1 | 9/2003 | Galant |
| 2003/0235407 | A1 | 12/2003 | Lord |
| 2004/0024752 | A1* | 2/2004 | Manber et al. ............ 707/3 |
| 2004/0098754 | A1 | 5/2004 | Vella et al. |
| 2004/0111419 | A1* | 6/2004 | Cook et al. ............ 707/100 |
| 2004/0114571 | A1 | 6/2004 | Timmins et al. |
| 2005/0091694 | A1 | 4/2005 | Rambo |
| 2005/0114324 | A1 | 5/2005 | Mayer |
| 2005/0114449 | A1 | 5/2005 | Verhaeghe et al. |
| 2005/0128361 | A1 | 6/2005 | Li et al. |
| 2005/0144086 | A1 | 6/2005 | Speiser et al. |
| 2005/0144162 | A1* | 6/2005 | Liang ............... 707/3 |
| 2005/0197906 | A1 | 9/2005 | Kindig et al. |
| 2005/0246716 | A1* | 11/2005 | Smith et al. ............ 719/315 |
| 2006/0026152 | A1* | 2/2006 | Zeng et al. ............ 707/5 |
| 2006/0059134 | A1 | 3/2006 | Palmon et al. |
| 2006/0071950 | A1 | 4/2006 | Kurzweil et al. |
| 2006/0106793 | A1* | 5/2006 | Liang ............... 707/5 |
| 2006/0167857 | A1 | 7/2006 | Kraft et al. |
| 2006/0167864 | A1 | 7/2006 | Bailey et al. |
| 2006/0179051 | A1 | 8/2006 | Whitney et al. |
| 2006/0218573 | A1 | 9/2006 | Proebstel |
| 2006/0224552 | A1 | 10/2006 | Riezler et al. |
| 2006/0242554 | A1 | 10/2006 | Gerace et al. |
| 2007/0005564 | A1 | 1/2007 | Zehner |
| 2007/0011155 | A1* | 1/2007 | Sarkar ............... 707/5 |
| 2007/0033533 | A1* | 2/2007 | Sull ............... 715/752 |
| 2007/0088603 | A1 | 4/2007 | Jouppi et al. |
| 2007/0094247 | A1 | 4/2007 | Chowdhury et al. |
| 2007/0101365 | A1 | 5/2007 | Clark et al. |
| 2007/0112817 | A1 | 5/2007 | Danninger |
| 2007/0130563 | A1 | 6/2007 | Elgazzar et al. |
| 2007/0156677 | A1 | 7/2007 | Szabo |
| 2007/0174237 | A1 | 7/2007 | Wilbrink et al. |
| 2007/0208719 | A1 | 9/2007 | Tran |
| 2007/0226183 | A1 | 9/2007 | Hart et al. |
| 2007/0233736 | A1 | 10/2007 | Xiong et al. |
| 2007/0261099 | A1 | 11/2007 | Broussard et al. |
| 2007/0276818 | A1* | 11/2007 | Cook et al. ............ 707/3 |
| 2007/0300258 | A1 | 12/2007 | O'Connor et al. |
| 2008/0005118 | A1 | 1/2008 | Shakib et al. |
| 2008/0077568 | A1 | 3/2008 | Ott |
| 2008/0155627 | A1 | 6/2008 | O'Connor et al. |
| 2009/0034805 | A1* | 2/2009 | Perlmutter et al. ........... 382/118 |
| 2010/0114882 | A1 | 5/2010 | Wiegering et al. |

OTHER PUBLICATIONS

Ozgur Ozturk "Effective Indexing and Filtering for Similarity Search in Large Biosequence Databases" Ohio State University, Columbus, OH 2003.*

Agichtein et al., *Improving Web Search Ranking by Incorporating User Behavior Information*, SIGIR '06, Aug. 6-11, 2006. Seattle, Washington, USA Copyright 2006 ACM, pp. 19-26.

Baker, L., "Blinkx.TV: More Video Than Google, Yahoo or YouTube", Search Engine Journal, Jun. 14, 2006, pp. 1-7, http://www.searchenginjournal.com/blinkxtv-more-video-than-google-yahoo-or-myspace/3532/(Visited Mar. 5, 2008).

Joho et al., *Effectiveness of Additional Representations for the Search Result Presentation of the Web*, Joho, H. and Jose, J. M. (2005). A Comparative Study of the Effectiveness of Search Results Presentation on the Web. In: Lalmas, M., et al. (Eds.) Advances in Information Retrieval, 28th European Conference on Information Retrieval, pp. 302-313, L.

Lang, *A tolerance Rough Set Approach to Clustering Web Search Results* Institute of Mathematics Faculty of Mathematics, Informatics and Mechanics Warsaw University, Dec. 2003, pp. 1-77.

Sebastiani, F. 1999 Machine Learning in Automated Text Categorization. Technical Report. UMI Order No. 1999-B4-31-12., Centre National de la Recherche Scientifique. 47 pages.

International Search Report issued in International Application No. PCT/US07/73999, dated Jul. 7, 2008, 8 pages.

Adamic et al. "How to search a social network" social networks 27 (2005) 187-203 HP Labs 1501 Page Mill Road Palo Alto CA 94304 USA www.esevier.com/locate/socnet © 2005 Elsevier B.V.

* cited by examiner

Document Feature Vector

| Doc Term: Madonna | Doc Term: Horse | Term Frequency: Madonna = 100 | Term Frequency: Horse = 50 | Length: 9 Pages | Source: News.com | Date: 8/17/2005 |
|---|---|---|---|---|---|---|
| 411 | 412 | 413 | 414 | 415 | 416 | 417 |

410

Query Feature Vector

| Query Term: Madonna | Length: 1 word | Date: 8/19/2005 | User: MadgeFan | User Profile Data |
|---|---|---|---|---|
| 421 | 422 | 423 | 424 | 425 |

SYSTEMS AND METHODS FOR PROVIDING CULTURALLY-RELEVANT SEARCH RESULTS TO USERS

CROSS REFERENCE TO RELATED APPLICATIONS

This application is a National Stage of International Application No. PCT/US2007/073999, filed Jul. 20, 2007, which claims the benefit of U.S. patent application Ser. No. 11/538,729, filed Oct. 4, 2006, which claims the benefit of U.S. Provisional Application No. 60/820,024, filed Jul. 21, 2006 and titled "Using Query Trend Vectors to Identify & Prioritize 'Culturally Relevant' Search Results, and U.S. Provisional Application No. 60/820,726, filed Jul. 28, 2006 and titled "Culturally Relevant Search Results", all of which are incorporated herein by reference in their entirety.

TECHNICAL FIELD

This description relates to culturally relevant search results.

BACKGROUND

Users seeking information may sometimes reference the Internet. To do so, the user may enter a search query into a search engine and, in response, may receive search results that are relevant to the search query. If the user seeks search results in a particular format, such as, for example, audio or video search results, a user may include one of the words "audio" or "video" in the search query along with words that relate to the content the user seeks.

SUMMARY

In a general aspect, search results are provided to a user. A search query is received from the user. A query feature vector is formed for the search query. The query feature vector is compared with news feature vectors associated with documents related to current events. An augmented query feature vector is formed based on results of the comparison of the query feature vector with the news feature vectors. The augmented query feature vector is compared with feature vectors related to target documents. Search results that include target documents are identified based on results of the comparison of the augmented query feature vector with the feature vectors related to the target documents. The user is enabled to perceive at least some of the identified search results.

With respect to at least the general aspect, implementations may include one or more of the following features. For example, enabling the user to perceive the identified search results may include enabling the user to perceive only the identified search results. Relevance of each of the identified search results to the search query may be determined and the identified search results may be sorted based on the determined relevance.

Enabling the user to perceive the search results may include sorting the identified search results into a first group of search results including identified search results that are closely related to a current event and a second group including identified search results that have no particular known relationship with the current event, and enabling the user to perceive a difference between the first and second groups of identified search results.

The user may be enabled to perceive other search results in addition to and integrated with the identified search results. Relevance of each identified and other search result to the search query may be determined and the identified and other search results may be sorted based on the determined relevance.

Forming the augmented query feature vector may include identifying terms that are included in the news feature vector, but absent from the query feature vector, and forming the augmented query feature vector by adding the identified terms to the query feature vector. Forming the augmented query feature vector may include identifying terms included in the query feature vector, but absent from the news feature vector, and forming the augmented query feature vector by removing the identified terms from the query feature vector. Forming the augmented query feature vector may include identifying terms included in the query feature vector that are similar to, but different from, terms included in the news feature vector, and forming the augmented query feature vector by modifying the identified terms in the query feature vector to conform to the identified terms in the news feature vector.

The query feature vector may be compared with the news feature vectors. News result feature vectors may be determined based on results of the comparison of the query feature vector with the news feature vectors. Forming the augmented query feature vector may include forming the augmented query feature vector based on the news result feature vectors. Comparing the augmented query feature vector with the feature vectors related to target documents may include comparing the augmented query feature vector with target feature vectors associated with target documents to identify the search results.

The query feature vector may be compared with the news feature vectors. News result feature vectors may be determined based on results of the comparison of the query feature vector with the news feature vectors. A centroid feature vector may be determined based on the news result feature vectors. The centroid feature vector may be determined based on at least one of clustering and determining a weighted average of the news feature vectors. Forming the augmented query feature vector may include forming the augmented query feature vector based on the centroid feature vector. Comparing the augmented query feature vector with feature vectors related to target documents may include comparing the augmented query feature vector with target feature vectors associated with target documents to identify the search results.

The query feature vector may be compared with the news feature vectors. News result feature vectors may be determined based on results of the comparison of the query feature vector with the news feature vectors. A centroid feature vector may be determined based on the news result feature vectors. The centroid feature vector may be determined based on at least one of clustering and determining a weighted average of the news feature vectors. Forming the augmented query feature vector may include forming the augmented query feature vector based on the centroid feature vector. Comparing the augmented query feature vector with the feature vectors related to target documents may include comparing the augmented query feature vector with the temporary feature vectors to identify the search results.

A target corpus data store that references target documents may be accessed. Target documents may include at least some documents related to current events. A target feature vector may be formed for each target document.

A news corpus data store that references documents related to current events may be accessed. The current events may be events related to human action. A news feature vector may be formed for each document related to the current events.

Enabling the user to perceive the search results may include determining a relationship between the search results and a current event, and providing the search results to the user as a perceivable list of search results organized with search results that are closely related to the current event being positioned closer to the top of the list than other search results.

Enabling the user to perceive the search results may include distinguishing search results that are closely related to a current event from search results that have no particular known relationship with the current event, and providing the search results to the user as a perceivable list of search results organized with the search results that are closely related to the current event being separated from the search results that have no particular known relationship with the current event using a label.

Enabling the user to perceive the search results may include determining search results that are closely related to a current event, determining search results that have no particular known relationship with the current event, blending the search results that are closely related to the current event with the search results that have no particular known relationship with the current event, and providing the search results to the user as a perceivable list of search results organized with the search results that are closely related to the current event being indistinguishable from the search results that have no particular known relationship with the current event.

Enabling the user to perceive the search results may include determining search results that are closely related to a current event, determining search results that have no particular known relationship with the current event, blending the search results that are closely related to the current event with the search results that have no particular known relationship with the current event, and providing the search results to the user as a perceivable list of search results organized with the search results that are closely related to the current event being distinguishable from the search results that have no particular known relationship with the current event.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 4 is an illustration of an exemplary document feature vector and an exemplary query feature vector.

DETAILED DESCRIPTION

Figure 1:
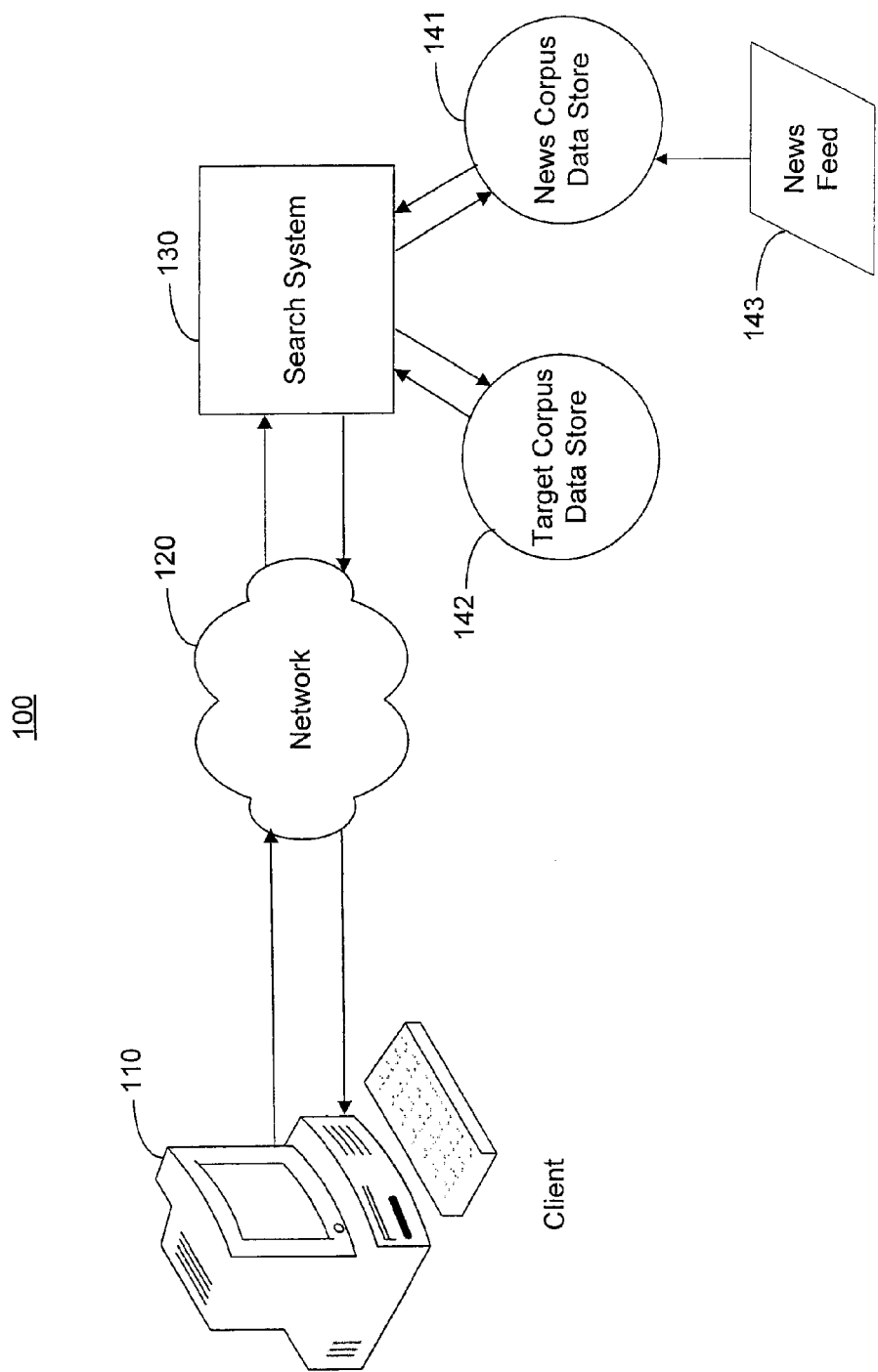
FIG. 1 shows an exemplary communications system for providing culturally relevant search results.

A user may seek information about a current event. To obtain such information, the user enters a term or phrase related to the event into a search engine. For example, during the 2006 NCAA basketball tournament, the men's basketball team of George Mason University became a surprise success story. Based on this event, many new searches for "George Mason" may have been motivated by user desire to find out the latest news about the University. However, the users who entered the search query "George Mason" nonetheless received search results that prioritized information related to the University in general, and perhaps its athletic programs. As such, users were forced to think about how to refine their query to find the right news, which may require extra knowledge about what the latest news was and extra effort to express a more limited query. For example, a user may enter a narrower search query, such as, for example, "George Mason basketball" to aid in retrieving results that satisfy the user's information need.

Instead of requiring the user to take these extra steps and have such extra knowledge, this application proposes to present a list of search results to a user, in response to a search query, where search results that are culturally relevant may be displayed in a visually prominent manner (e.g., at, or near, the top of the search result list (i.e., boosted) or grouped and/or labeled based on the culturally relevant event to which the search results relate). With respect to the present example, users who entered the search query "George Mason" would be presented with a list of search results having, at the top of the list (or grouped), those search results that are related to the culturally relevant (e.g., current) event of the men's basketball team's success.

A search result may be deemed to be culturally relevant if, for example, the search result corresponds to information that is related to a current event. And, an event may be, for example, an occurrence that is deemed newsworthy (i.e., of interest to the public in general or to a large group of people). Events may include, for example, an occurrence or an action performed by an individual, a group of people, a famous person or famous people, a country, a government official, an organization, a business or a sports team. An event may be deemed current with respect to a search query if it is an occurrence that takes place at a time that is proximate to the time at which the search query was submitted. Depending on the type of event, an event may be deemed current, for example, if it occurred from one second to one year prior to submission of the search query.

As such, a culturally relevant search result is a search result that corresponds to information about a current event. Examples of culturally relevant search results include (1) the men's basketball team of George Mason University making it to the Final Four of the NCAA tournament, (2) the singer Madonna having a horseback riding accident, (3) NASA launching the space shuttle Atlantis, (4) a military coup taking place in Thailand to oust the Prime Minister, and (5) President Bush giving the State of the Union address.

Two ways can be used to boost the most culturally relevant search results in search rankings and/or clustered appropriately. First, data trends can be determined as the trends occur, by monitoring, for example, user search queries and news feeds. The dates on which a volume of user search queries related to a particular topic exceeds typical levels may be used to determine whether an event is current. Similarly, the dates on which event feeds are received and event reporting web sites are updated also may be used to determine whether an event is current. Events may be reported and identified based on news feeds and news reporting web sites. The trends may be used to boost or group search results provided in response to a search query that includes terms or phrases that are related to one or more of the trends. The culturally relevant search results then may be tied back into an ontology in order to determine more search results related to the trend and/or similar topics.

Second, feature vectors may be generated based on documents that include content related to current events (i.e., news). The feature vectors may be used to boost and/or group search results that are determined based on information that is not current event-specific. Additionally, or alternatively, a feature vector generated based on current event documents may be used to adjust or enhance a search query provided by a user to ensure that search results provided in response thereto take into account current events.

Communications system 100 of FIG. 1 is configured to provide culturally relevant search results. The system 100 includes a client 110 that may communicate with a search system 130 through a network 120.

Each of the client 110 and the search system 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 and search system 130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110 or the search system 130.

The client 110 may include one or more devices capable of accessing content on the search system 130. The search system 130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, a media player, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, the client 110 may include a wireless telephone running a micro-browser application on a reduced operating system with general purpose and specialized hardware capable of operating in mobile environments.

The network 120 includes hardware and/or software capable of enabling direct or indirect communications between the client 110 and the search system 130. As such, the network 120 may include a direct link between the client 110 and the search system 130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The search system 130 may include a general-purpose computer having a central processor unit (CPU), and memory/storage devices that store data and various programs such as an operating system and one or more application programs. Other examples of a search system 130 includes a workstation, a server, a special purpose device or component, a broadcast system, other equipment, or some combination thereof capable of responding to and executing instructions in a defined manner. The search system 130 also may include an input/output (I/O) device (e.g., video and audio input and conversion capability), and peripheral equipment such as a communications card or device (e.g., a modem or a network adapter) for exchanging data with the network 120.

The search system 130 is generally capable of executing instructions under the command of a controller. The search system 130 may be used to provide content to the client 110. The controller may be implemented by a software application loaded on the search system 130 for commanding and directing communications exchanged with the client 110. Other examples of the controller include a program, a piece of code, an instruction, a device, a computer, a computer system, or a combination thereof, for independently or collectively instructing the client 110 or the search system 130 to interact and operate as described. The search system 130 may be embodied permanently or temporarily in any type of machine, component, physical or virtual equipment, storage medium, or propagated signal capable of providing instructions to the client 110 or the search system 130.

More particularly, the client 110 may receive a search query from a user and may provide the search query to the search system 130 through the network 120. The search system 130 may receive the search query and may determine culturally relevant search results to provide to the user in response to the search query. To do so, the search system 130 may access a target corpus data store 142 and a news corpus data store 141.

The target corpus data store 142 is a representation of various locations that include documents on many topics that may be searched to determine all documents that match a search query. Documents to be searched may be physically located in, for example, databases on public or private remote servers across public (e.g., the Internet) and private networks (e.g., a LAN), or in private locally-stored databases. As such, the target corpus data store 142 may include, for example, references to, or representations of, these various documents. However, for simplicity, and illustrative purposes, the target corpus data store 142 may be referred to as being the location of the documents that may be searched.

The news corpus data store 141 may include documents related to current events. The word corpus may be used to refer to the collection of documents stored within data stores 141 and 142. The news corpus data store 141 may be referred to as including current events-related documents, for simplicity and illustrative purposes. However, as described above with respect to the target corpus data store 142, the news corpus data store 141 may include, for example, references to, or representations of, these documents.

Documents included in the news corpus data store 141 also may be included in the target corpus data store 142 since the target corpus data store includes documents related to current events and non-current events, as well as documents related to topics that are not event-related or dependent. The news corpus data store 141 may be populated and updated with documents that are included in, and supplied to the news corpus data store 141 by a news feed 143. To ensure that the events are current, documents may be removed from the news corpus data store 141 once they become stale, i.e., once the event to which a document relates is no longer a current event.

The news corpus data store 141 may be used by the search system 130 to determine current events that are likely related to a particular search query and documents from the news corpus data store 141 may be returned to a user as search results. Additionally, or alternatively, documents in the news corpus data store 141 may be used by the search system 130 to augment a search query with information related to a current event associated with the query. The search system 130 then may identify documents from within the target corpus data store 142 that match the augmented search query to provide as search results.

In either case, the search system 130 may determine culturally relevant search results and provide them to the client 110 through the network 120. The client 110 then may display the culturally relevant search results to the user who entered the search query or otherwise enable the user to perceive the culturally relevant search results.

Figure 2:
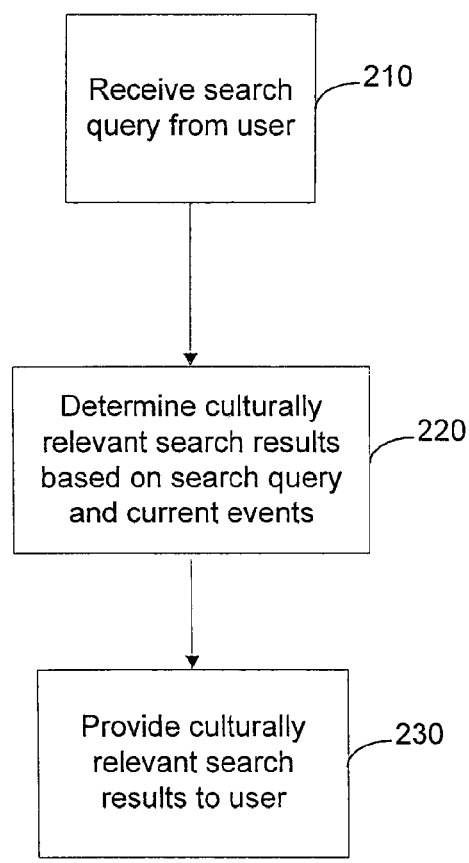
FIGS. 2 and 3 are flow charts of two exemplary processes for providing culturally relevant search results.
Figure 3:
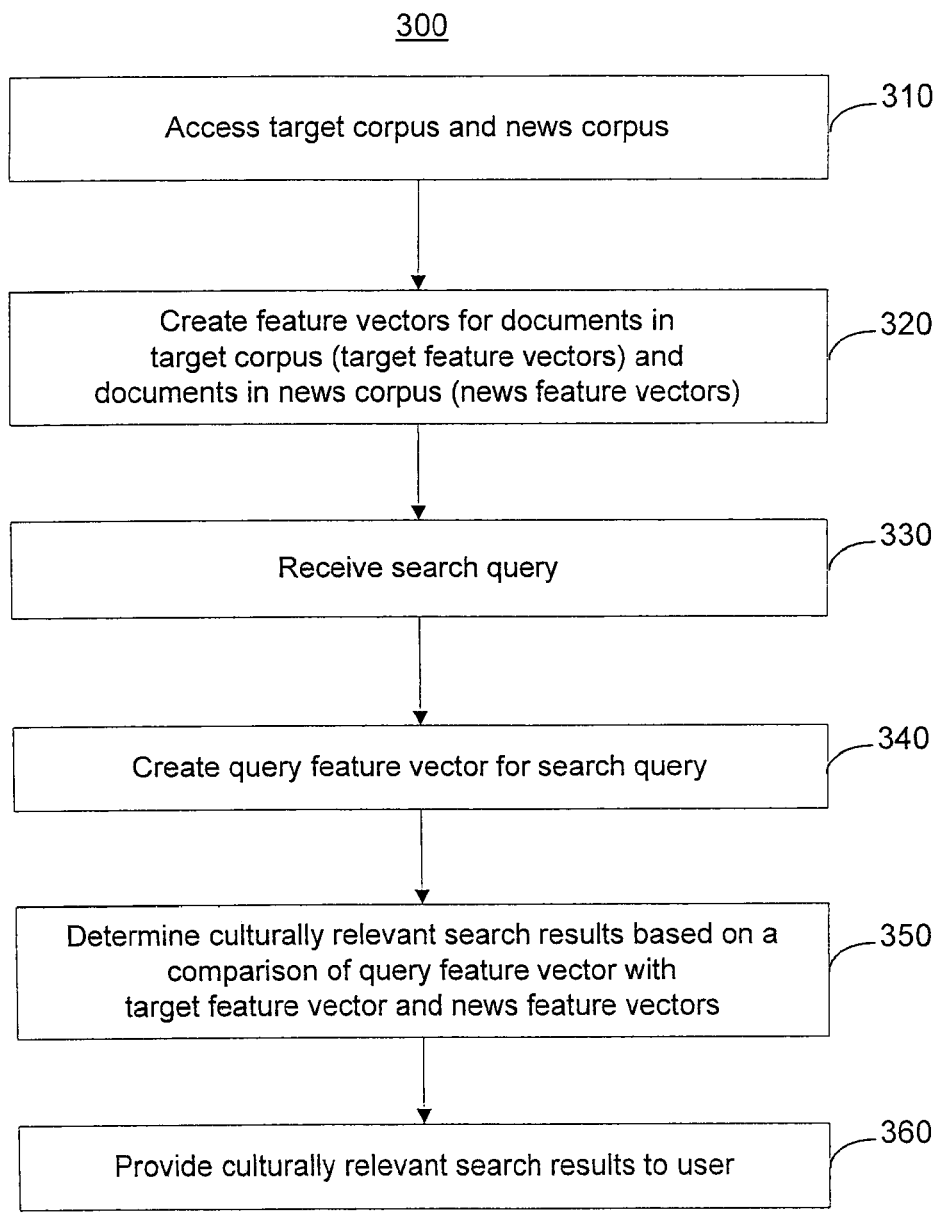

Processes 200 and 300 of FIGS. 2 and 3, respectfully are configured to provide culturally relevant search results. For convenience, particular components described with respect to FIG. 1 are referenced as performing the processes 200 and 300. However, similar methodologies may be applied in other implementations where different components are used to define the structure of the system, or where the functionality is distributed differently among the components shown by FIG. 1.

Process 200 is a general process for determining and providing culturally relevant search results. The search system 130 receives a search query from a user (210). The user may enter a search query into a text entry box associated with a search engine. For example, a user enters the search query "George Mason" into a search query text entry box associated with a search engine.

The search system 130 determines culturally relevant search results based on the search query and current events (220). More precisely, the search system 130 may receive a search query and process the search query to identify a group of electronic search results that satisfy the query. To do so, the search system 130 accesses a collection of documents to determine which, if any, of the documents include information that is related to the search query. In the present example, the search system 130 accesses a collection of documents to determine which documents include information related to the search query "George Mason." The documents accessed by the search system 130 include both non-culturally relevant, or general, documents (e.g., documents that are not necessarily related to current events) and culturally relevant documents (e.g., documents that have been previously determined to be related to current events). By taking into account documents that are culturally relevant, search results may be determined based on both the search query "George Mason" and current events.

The search system 130 provides the culturally relevant search results to the user (230). The search system 130 enables the user who provided the search query to access or perceive the group of culturally relevant search results determined to be responsive to the search query. Each of the search results typically includes a link selectable by the user to access a content item that is deemed by the electronic search system to satisfy the information need represented by the query. The content item may be, for example, an electronic document (e.g., a web page or a pdf document), an audio stream, or a video stream.

Process 300 is a specific implementation of a process for determining and providing culturally relevant search results.

The search system 130 accesses a target corpus data store and a news corpus data store 141 (310). The target corpus data store includes documents that may be searched by the search system 130 to determine results for a particular search query. The news corpus data store 141 includes documents having information about current events. The term document is used herein to refer to a discrete information item, or information source, such as, for example, a web page, a pdf document, a video or audio clip, a slideshow presentation or a spreadsheet.

The news corpus data store 141 is populated and updated with current event documents by a news feed 143 that includes, and therefore provides the news corpus data store 141 with, a continuous stream of current event-related documents. In some implementations, the news feed 143 stores a copy of each current event-related document in the news corpus data store 141. Alternatively, news feed 143 may store a link or reference to each current event-related document in the news corpus data store 141 that may allow the news corpus data store 141 to access the current event-related documents from a storage location outside the data store 141. As mentioned above, documents may only remain in the news corpus data store 141 for a limited amount of time to ensure that the news corpus data store 141 includes the most recent documents. The amount of time after which a document may be deemed stale may vary based on the source of the document or a topic related to the document. For example, documents from news outlets (e.g., the CNN web page) may be deemed stale after 24 hours, while documents associated with science may not be deemed stale until 6 months have passed.

The search system 130 creates feature vectors for documents in the target corpus data store 142, referred to as target feature vectors, and also creates feature vectors for documents in the news corpus data store 141, referred to as news feature vectors (320). A feature vector is an n-dimensional vector (i.e., collection) of features, or data, extracted from raw data for further processing. In other words, a feature vector is a description of an input (e.g., a document) that includes one or more parameters in order to label the input, find the input later and/or determine if the input is related to something else (e.g., a user query). Creation or formation of a feature vector is described in detail below.

The search system 130 receives a search query from a user (330). Typically, an electronic search system may receive a search query and process the search query to identify a group of electronic search results that satisfies the query. The electronic search system enables an entity, typically a user, to access or perceive the group of search results. Each of the electronic search results typically includes a link selectable by the user to access a content item that is deemed by the electronic search system to satisfy the information need represented by the query. The content item may be, for example, an electronic document (e.g., a web page or a pdf document), an audio stream, or a video stream.

More particularly, the search system 130 processes the search query by creating a feature vector for the search query, referred to as a query feature vector (340), as also described below. The search system 130 compares the query feature vector with the target feature vectors and the news feature vectors to determine culturally relevant search results for the search query (350). The culturally relevant search results are then provided to the user by the search system 130 (360).

An exemplary document feature vector 410 and an exemplary query feature vector 420 are both illustrated in FIG. 4. More particularly, document feature vector 410 is related to an input of a news article on the www.news.com web site and query feature vector 420 is related to the user query "Madonna."

The news article relates to an incident where the singer Madonna had a horse-riding accident. The news article may be included in the news corpus data store 141, and thus a document feature vector 410 may be created for the news article. The document feature vector 410 includes terms 411 and 412 found within the document (e.g., "Madonna" and "horse"), a frequency indication 413 and 414 for each of the terms (e.g., 100 for "Madonna" and 50 for "horse"), a length 415 of the document (e.g., 9 pages), a source 416 of the document (e.g., www.news.com) and a date 417 on which the document was published or most recently updated (e.g., Aug. 17, 2005). In some implementations, the date may refer to a date on which the document feature vector was generated.

In some implementations, document feature vectors, such as, for example, the document feature vector 410, may be stored either indefinitely, until the document query feature vector is no longer needed (e.g., the document no longer exists in the news corpus data store 141 and/or target corpus data store 142) or a particular amount of time expires (e.g., a topically-based amount of time after which a particular document (or similar documents related to a topic to which the particular document is related) is no longer chronologically relevant—the document is stale—or a predetermined amount of time expires). Document feature vectors may be stored within a portion of target corpus data store 142 and/or news corpus data store 141, depending on whether the document is associated with just the target corpus or the target corpus and the news corpus. Storing document feature vectors allows for comparisons (as described below) between future user search queries and documents within the news and/or target corpuses for which document feature vectors have already been created, without requiring the document feature vector for a particular document to be created anew. Alternatively, document feature vectors may not be stored in order to reserve storage space for other files, and instead, may be dynamically created for a particular document each time a search query is to be compared to the particular document.

A user may seek information about Madonna's horse incident by entering the term "Madonna" as a user search query. A query feature vector 420 may be created for the search query, and may include one or more query terms 421 (e.g., "Madonna"), a length 422 of the query (e.g., 1 word), a date 423 on which the query was entered by the user (e.g., Aug. 19, 2005), a user identifier 424, such as, for example, a screen name, associated with the user who entered the search query (e.g., MadgeFan) and data related to a user interest profile 425 associated with the user.

The query feature vector 420 may be compared with document feature vectors corresponding to documents in the news corpus data store 141 (e.g., the document feature vector 410) to determine if any documents related to current events satisfy the user's information gap associated with the terms in the search query. In the present example, because the date on which the news article describing the event was published is chronologically proximate to the date on which the user entered the search query, the event is a current event and the current event may be related to the search query. In addition, because the terms included in the document about Madonna's horse incident are similar to the query term "Madonna," the search query may be deemed to be representative of something more than general information about the singer. Thus, based on the chronological and topical similarity between the search query and the news article, the search system 130 may assume that the user does not seek information about Madonna in general (e.g., CD release dates, concert tickets or celebrity gossip), but rather that the user is interested in information related to the singer's horse incident.

Additionally, or alternatively, the query feature vector 420 also may be compared to document feature vectors created for documents in the target corpus data store (not shown). The target corpus data store 142 includes documents that are related to current events, and also documents that are not necessarily related to current events. The search system 130 may search the target corpus data store 142 for documents that may include general information related to the search query. For example, a document feature vector (i.e., target feature vector) may be created for a web page stored in the target corpus data store 142 that describes Madonna's most recent song. The query feature vector 420 and the target feature vector may be deemed similar, and thus, depending on the implementation, the web page may be included in the search results for the query "Madonna" even though the web page is not necessarily related to the most current event related to the singer.

Figure 5A:
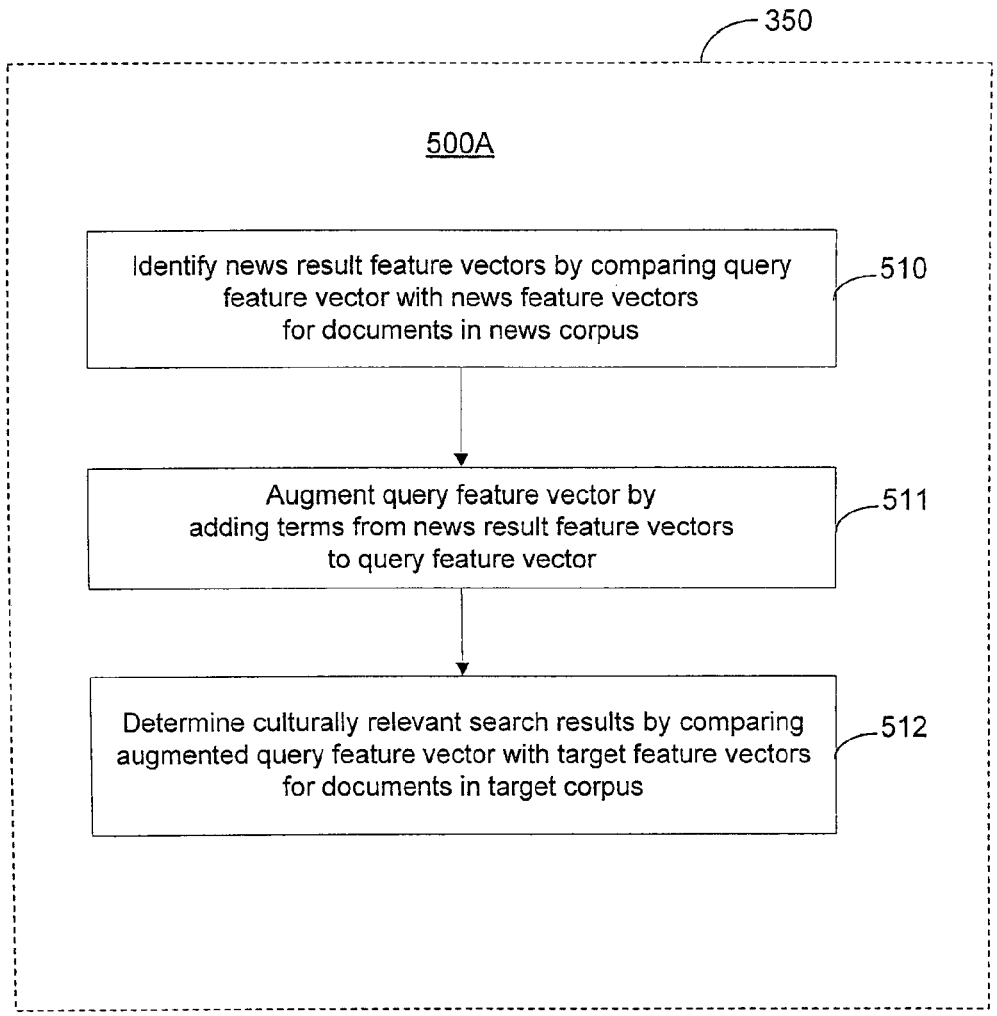
FIGS. 5A, 5B and 5C are flow charts of exemplary processes for comparing a query feature vector with both target feature vectors and news feature vectors to determine culturally relevant search results.
Figure 5B:
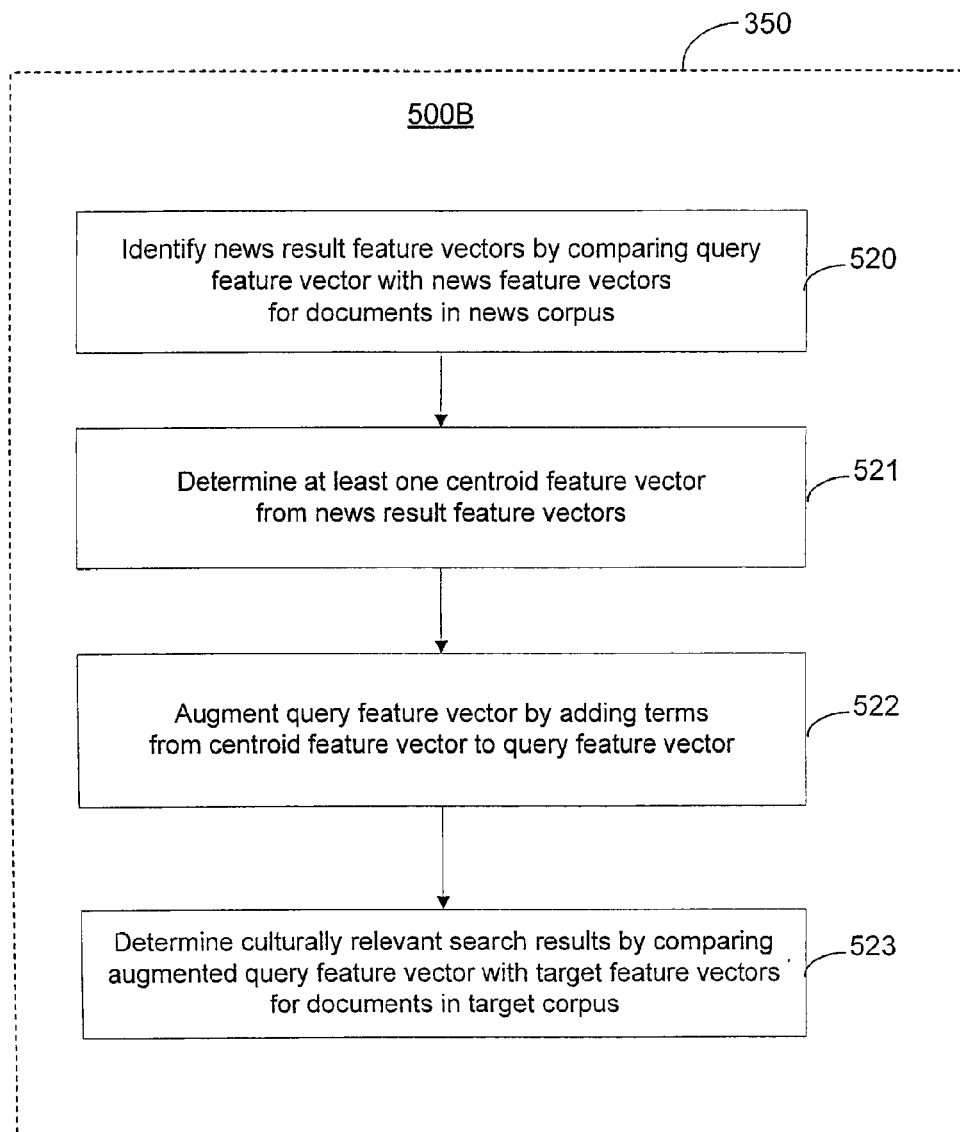
Figure 5C:
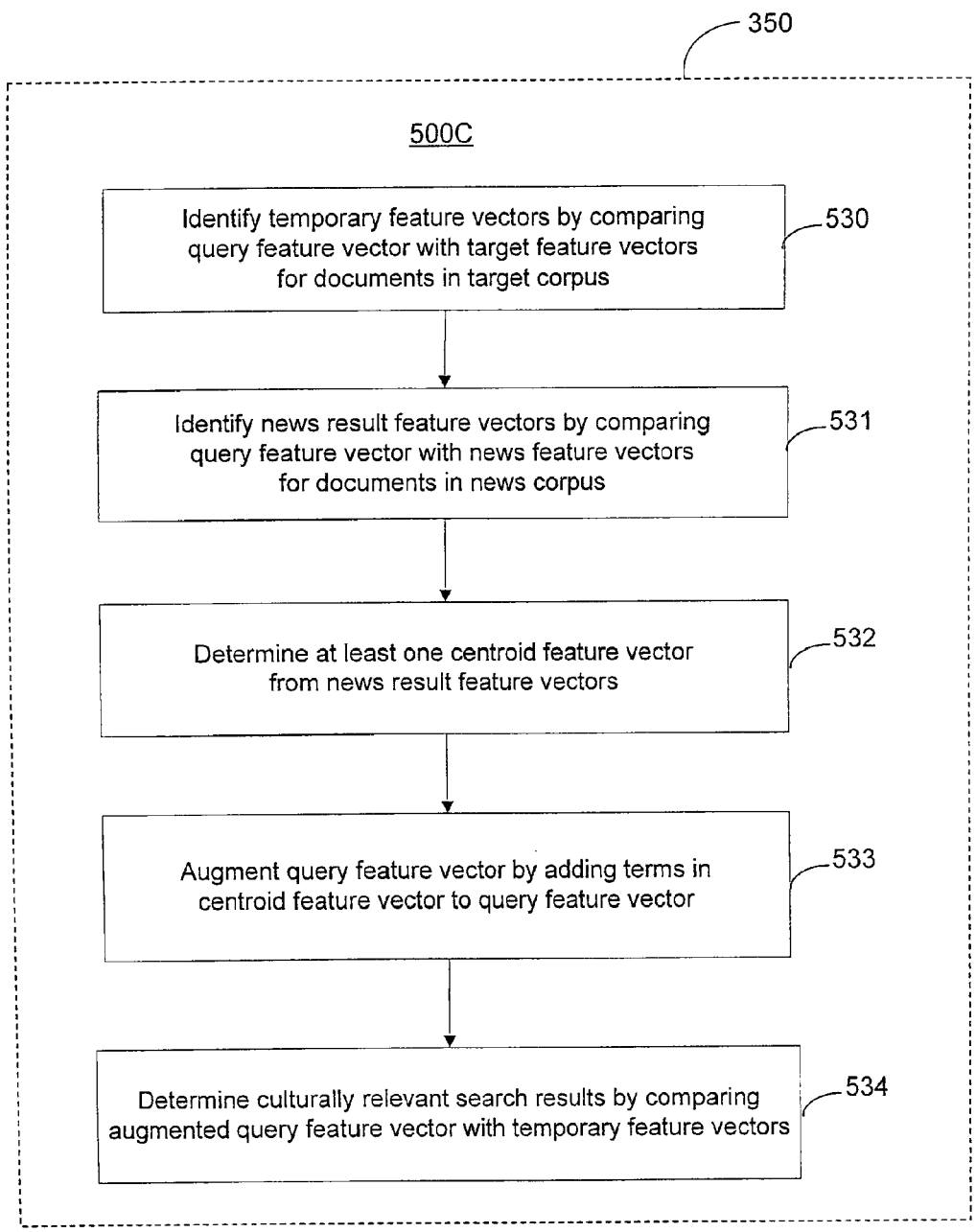

Processes 500A, 500B and 500C, of FIGS. 5A, 5B, and 5C, respectively, are configured to compare a query feature vector with both target feature vectors and news feature vectors to determine culturally relevant search results. Processes 500A-500C represent three alternative exemplary methods for implementing operation 350 of FIG. 3. For convenience, particular components described with respect to FIG. 1 are referenced as performing the processes 500A, 500B and 500C. However, similar methodologies may be applied in other implementations where different components are used to define the structure of the system, or where the functionality is distributed differently among the components shown by FIG. 1.

Referring to FIG. 5A, process 500A includes the search system 130 comparing a query feature vector with news feature vectors for documents in the news corpus to identify news documents that match the query feature vector (510). If the query feature vector and a particular news feature vector are similar, the document corresponding to the particular news feature vector is deemed a match for the search query and the particular news feature vector is designated as a news result feature vector. Feature vectors may be identified as similar if information included in one or more fields of each of the feature vectors is the same, or similar, as described in more detail below.

The search system 130 augments the query feature vector by adding terms from one or more of the identified the news result feature vectors to the query feature vector (511). The augmented query feature vector thereby represents the original search query, as well as information associated with any current events (as described by documents in the news corpus data store 141) related to the search query. In other words, the augmented search query feature vector explicitly includes information related to one or more current events. The search system 130 compares the augmented query feature vector with target feature vectors to determine culturally relevant search results (512). Comparison of feature vectors may be performed by, for example, process 600 of FIG. 6, as described in more detail below.

For example, a query feature vector may include the term "Madonna" and a date of submission of the query of Aug. 19, 2005. A news result feature vector may represent a news document published on Aug. 17, 2005 that includes content related to Madonna falling off her horse. The news result feature vector includes data that identifies it as an event that is current in relation to the query feature vector. Thus, the query feature vector may be augmented based on the news result feature vector to include the term "horse" in addition to the original term "Madonna." A first target feature vector may relate to a document that includes content about Madonna's new album and a second target feature vector may relate to the same document that was present in the news corpus and represented by the news result feature vector. Thus, the documents related to both the first and second target feature vectors may be returned as search results. However, only the document related to the second target feature vector may be identified and provided as a culturally relevant result because it relates to an event that is current to the query and includes terms that are also included in the augmented query feature vector.

Referring to FIG. 5B, process 500B includes the search system 130 comparing the query feature vector with news feature vectors for documents in the news corpus to identify news documents that match the query feature vector (520). As stated previously, news feature vectors that match a query feature vector are referred to as news result feature vectors.

The search system 130 determines at least one centroid feature vector from the news result feature vectors (521). A centroid feature vector may represent an average feature vector for a group of feature vectors that include similar information. A centroid feature vector may be determined based on a clustering technique. As such, similar feature vectors may be clustered around one another due to the similarity of the information included therein. However, a group of feature vectors, such as, for example, news result feature vectors, may be broken down into two groups (or clusters), where feature vectors in each of the first and second groups have information that is similar to feature vectors in the same group, but markedly less similar to feature vectors in the other group. In this case, two centroids may be determined for the news result feature vectors determined in operation 520. For example, if George Mason University entered the final four in the NCAA basketball tournament and hired a new Dean around the same timeframe, the news result feature vectors determined in response to the query "George Mason University" may relate to two separate current events, and thus, two centroids for the news result feature vectors (i.e., one for each event) may be determined. For example, the two centroids may both include the term "George Mason," while the first centroid also includes the term "basketball" and the second centroid also includes the word "Dean." Alternatively, the centroid feature vector may be a weighted average of a group of feature vectors, such as, for example, the news result feature vectors. As such, the centroid feature vector may include, for example, a collection of terms that are prevalent in the news result feature vectors, notwithstanding any outliers. For example, for news result feature vectors related to George Mason University, a centroid feature vector may include the terms, for example, "George Mason," "Arlington, Va.," "basketball," "Dean," and "Patriots."

The search system 130 augments the query feature vector by adding terms from the centroid feature vector(s) to the query feature vector (522). Terms within the augmented query feature vector that were included in the original query feature vector (i.e., in the original search query) may be weighted to ascribe to them more importance than terms added from the news result feature vectors. As described above, the augmented query feature vector represents the original search query and information related to current events associated with the search query. The search system 130 compares the augmented query feature vector with target feature vectors to determine culturally relevant search results (523). Comparison of feature vectors may be performed by, for example, process 600 of FIG. 6, as described in more detail below.

In both processes 500A and 500B, documents in the news corpus data store 141 are used to determine current events that may be related to the search query, and thus, may be related to the user's true information need. Once the current event or events related to the search query are determined, the search query, as augmented by the current event information, is compared against documents in the target corpus data store 142. Because the target corpus data store 142 includes documents that are related to current events (e.g., the same documents included in the news corpus data store 141), as well as documents related to non-current events, or non-event related documents, comparing the augmented query feature vector against the target corpus data store 142 may result in identification of a broad range of matching documents that take into account both the user's search query and current events. Thus, the user may be provided with at least some search results that are culturally relevant to current events in which the user is likely interested.

Referring to FIG. 5C, process 500C includes the search system 130 comparing the query feature vector with target feature vectors for documents in the target corpus to identify temporary documents that match the query feature vectors (530). The target feature vectors of the matching temporary documents are referred to as temporary feature vectors.

The search system 130 identifies news result feature vectors by comparing the query feature vector with news feature vectors for documents in the news corpus (531). The search system 130 determines at least one centroid feature vector from the news result feature vectors (532). As described above, the centroid feature vector(s) may be determined using a clustering technique or by determining a weighted average of all the news result feature vectors. The search system 130 augments the query feature vector by adding terms from the centroid feature vector to the query feature vector (533). As also described above, the terms in the augmented query feature vector that were included in the original search query may be weighted. The search system 130 compares the augmented query feature vector with the temporary feature vector to determine culturally relevant search results (534). Comparison of feature vectors may be performed by, for example, process 600 of FIG. 6, as described in more detail below.

The approach of FIG. 5C, as an initial step, compares the query feature vector with target feature vectors to determine temporary feature vectors that are then compared with news feature vectors, rather than initially comparing the query feature vector with news feature vectors, as in processes 500A and 500B of FIGS. 5A and 5B, respectively. The result of using process 500C may be the same as that of processes 500A and 500B. However, in some instances, it may be desirable to determine temporary feature vectors in this manner. For example, and in some implementations, general search results for documents identified from within the target corpus (e.g., documents corresponding to the temporary feature vectors) are to be presented to a user instead of, or in addition to, culturally relevant search results. Stated differently, temporary feature vectors may be used to identify documents that are responsive to a user search query prior to augmentation with information gleaned from documents in the news corpus.

In some implementations, rather than adding terms to the query feature vector to generate the augmented query feature vector during processes 500A, 500B, and 500C, terms may be removed from the query feature vector or modified in order to generate the augmented query feature vector. If a term is present in a query feature vector, but it is determined that the term may be unhelpful in determining culturally relevant search results, (e.g., the term is related to something other than the current event deemed to be associated with the search query and/or the term is not included in a feature vector that is being compared with the query feature vector) the unhelpful term may be removed during generation of the augmented query feature vector. If a term is present in a query feature vector and determined to be, for example, misspelled (e.g., a user seeking information on Hurricane Katrina enters the search query "hurricane ketrina," which misspelling may be determined based on terms included in a feature vector being compared with the query feature vector), the term may be modified in order to ensure that the augmented query feature vector does not include any misspellings.

Figure 6:
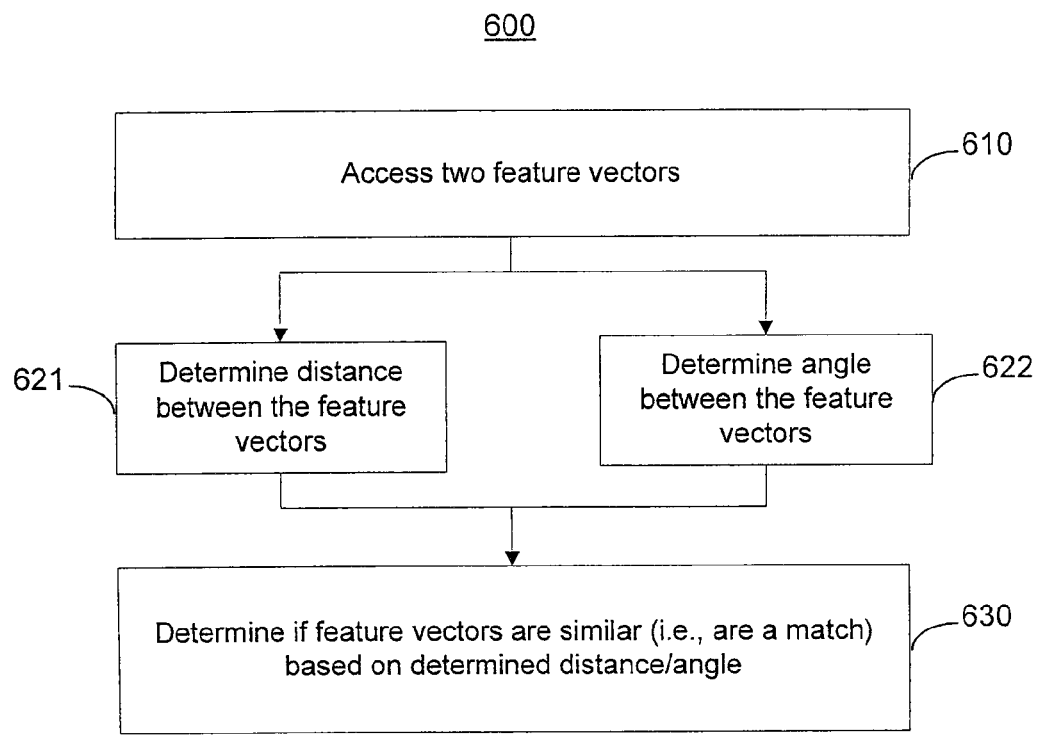
FIG. 6 is a flow chart of an exemplary process for comparing two feature vectors.

Process 600 of FIG. 6 is configured to compare two feature vectors. Process 600 is an exemplary implementation of operations 512, 523 and 534 of FIGS. 5A, 5B and 5C, respectively. For convenience, particular components described with respect to FIG. 1 are referenced as performing the process 600. However, similar methodologies may be applied in other implementations where different components are used to define the structure of the system, or where the functionality is distributed differently among the components shown by FIG. 1.

The search system 130 accesses two feature vectors, such as, for example, an augmented query feature vector and a target feature vector (610). The search system 130 may compare the two feature vectors using one of two methods to determine a degree to which the two feature vectors are similar. Feature vectors can be represented as points in two-dimensional space. To do so, the values of the fields for a feature vector may be referred to by a number, and the list of numbers within the vector can be considered coordinates. In a simple example, a feature vector that includes two fields (or pieces of data) may be represented by the coordinates (1,1) if the values in the two fields can each be represented by the number 1. Because the feature vectors can be represented as points in 2-dimensional space, a mathematical relationship between the feature vectors may be identified to determine a degree of similarity between two or more feature vectors.

The first method includes determining a distance between the two feature vectors (621). The distance may be, for example, a Euclidean distance. The second method includes determining an angle between the two feature vectors (622). The angle may be, for example, in reference to a 90° angle provided by intersection of the x-axis and the y-axis.

The search system 130 then determines if the two feature vectors are similar based on the determined distance or angle (630). A small distance or angle between two feature vectors may correspond to a large amount of similarity between the data represented by the feature vectors. If an augmented query feature vector is very similar to a target feature vector, the document corresponding to the target feature vector may be determined to be a culturally relevant search result for the search query corresponding to the query feature vector and the augmented query feature vector.

Figure 7:
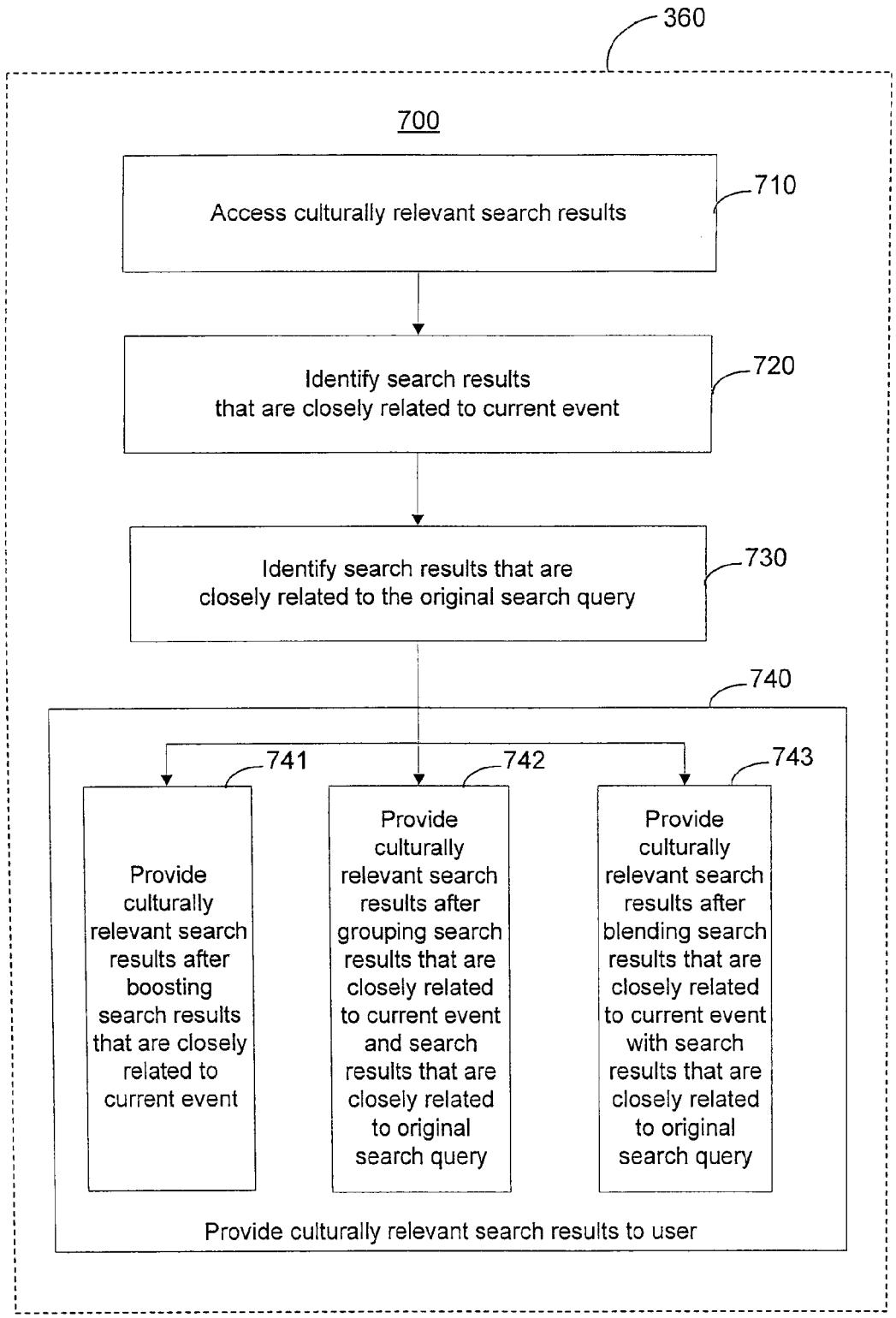
FIG. 7 is a flow chart of an exemplary process for providing a user with culturally relevant search results.

Process 700 of FIG. 7 is configured to provide a user with culturally relevant search results. Process 700 is an example of a process for performing operation 360 of FIG. 3. The culturally relevant search results may have been determined using at least one of processes 500A-500C. For convenience, particular components described with respect to FIG. 1 are referenced as performing the process 700. However, similar methodologies may be applied in other implementations where different components are used to define the structure of the system, or where the functionality is distributed differently among the components shown by FIG. 1.

The search system 130 accesses culturally relevant search results (710). The search system 130 identifies search results that are closely related to the one or more current events associated with the search query (720). The search system 130 also identifies search results that are closely related to the original search query, but not necessarily closely related to a current event (730). A search result may be identified as closely related to a current event or an original search query based on whether the content item associated with the search result is more similar to the current event or the original search query. In some instances, a particular result may be equally similar to both a current event and an original search query, and thus may be identified as closely related to both. To determine whether a search result is closely related to a current event, for example, the document feature vector associated with the content item corresponding to the search result may be compared (using process 600 of FIG. 6) with news result feature vectors. In another example, to determine whether a search result is closely related to an original search query, for example, the document feature vector associated with the content item corresponding to the search result may be compared (using process 600 of FIG. 6) with the query feature vector.

The search system 130 then provides the search results to the user or otherwise enables the user to perceive the search results (740). To do so, and in one implementation, the search system 130 may display the search results that were determined to be closely related to the current event at, or near, the top of a search results list (i.e., the search results that are closely related to the current event may be boosted) (741). In another implementation, the search system 130 may group the search results that are closely related to the current event in one group or a set of groups and also group the search results that are closely related to the original search query in another group or set of groups (742). As such, the search system 130 may provide search results to the user where search results are grouped based on a relationship to the current event and/or the original search query. In yet another implementation, the search system 130 may blend the search results that are closely related to the current event with the search results that are closely related to the original search query (743). As such, the search system 130 may provide search results to the user where the search results related to the current event are mixed in with the search results that are related to the original search query. For example, if the search results are displayed in a list, a search result related to a current event may immediately precede a search result related to the original search query which may, in turn, immediately precede another search result related to the current event. In some implementations, blended search results may include an icon or other designation that indicates to the user whether a particular search result is closely related to a current event or the original search query.

Figure 8:
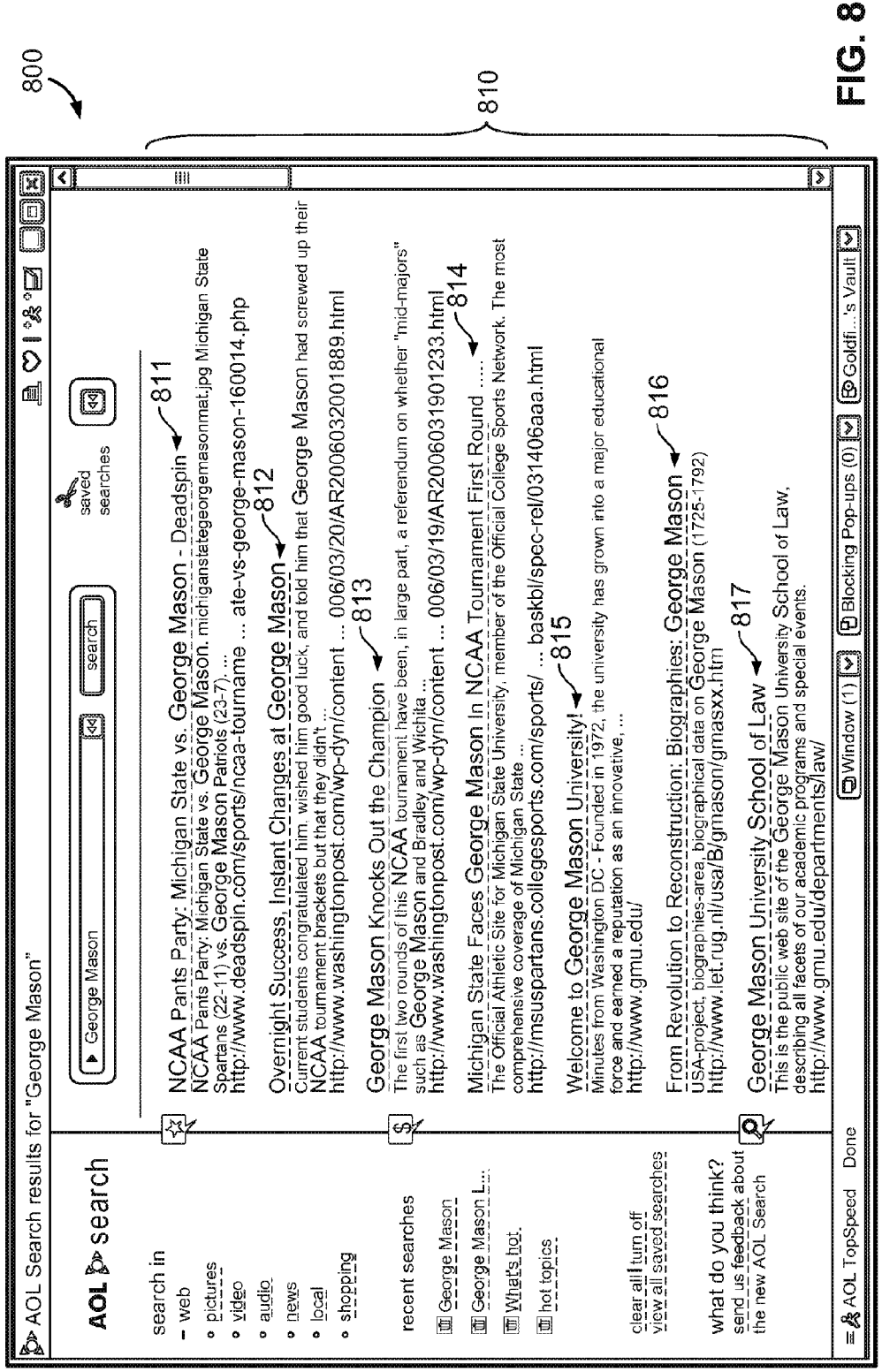
FIGS. 8, 9 and 10 are illustrations of user interfaces (UIs) for providing culturally relevant search results to the user.
Figure 9:
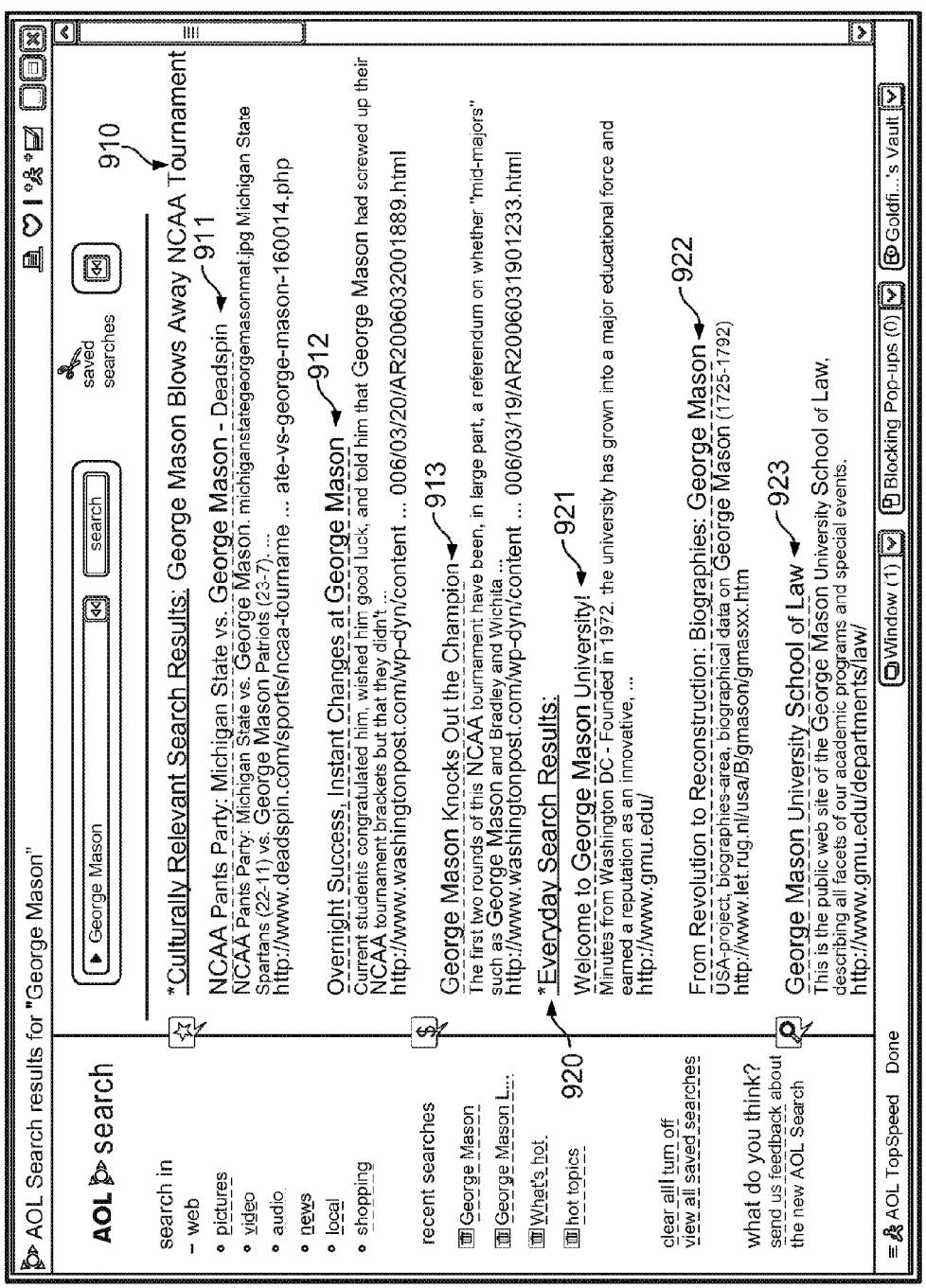
Figure 10:

UIs 800, 900 and 1000, of FIGS. 8, 9 and 10, respectively, are structured and arranged to provide culturally relevant search results to a user.

More particularly, UI 800 enables a user to perceive and access culturally relevant search results 810 identified in response to a search query "George Mason." The search query was entered by a user during the 2006 NCAA men's basketball tournament during which the George Mason University made an impressive showing. Search results 811-814 displayed in UI 800 are associated with the current event of the school's basketball prowess, and have been boosted to the top of the result list. As such, generic results related to the University (search results 815 and 817) or to a biography of Mr. George Mason (search result 816) are still provided, but the generic results are provided below the search results related to a current event. For example, the first search result 811 relates to the George Mason vs. Michigan State basketball game, while the last result 817 relates to the George Mason University School of Law.

UI 900 enables a user to perceive and access culturally relevant search results 910, such as, for example, search results 911-913 related to the current event of George Mason University destroying NCAA brackets, as well as everyday search results 920 that include more general search results 921-923, such as, for example, the George Mason University main web page (search result 921). By providing grouped search results, a user may easily navigate between search results that are related to one or more current events and search results that are typically provided in response to the search query and absent any current event related to the search query. Moreover, if the user is genuinely interested in general information related to the search query, and not as interested in search results 910 related to the current event, the user may easily avoid the culturally relevant search results 910 if the search results are grouped as shown.

UI 1000 enables a user to perceive and access culturally relevant video search results 1010-1040 in response to a video search query. A user may enter the query "George Mason" into a video search engine by selecting, for example, a video specialty search engine from a list of search engines, or otherwise indicating that the user wishes to receive videos as search results. UI 1000 shows video search results 1010-1040 that are related to the current event of George Mason's performance in the NCAA basketball tournament. However, as in UIs 800 and 900, UI 1000 also may be configured to provide grouped or ranked video search results related to the current event and/or the original search query. Other specialty search engines, such as, for example, picture, audio or shopping search engines also may be configured to provide culturally relevant search results as described.

A detailed account of one implementation of the techniques described herein is now presented with respect to the example of a user providing the search query "George Mason" in order to retrieve information related to the success of the men's basketball team in the 2006 NCAA tournament.

A user seeks information regarding the George Mason men's basketball team's performance during the 2006 NCAA tournament. In an attempt to retrieve such information, the user enters the search query "George Mason" (e.g., operation 330 of FIG. 3) The search system 130 generates a query feature vector for the search query "George Mason" (e.g., operation 340 of FIG. 3) The query feature vector may include the two query terms "George" and "Mason" provided in the search query, the query length "2 words," the date on which the query was provided by the user "Mar. 30, 2006", an identifier (e.g., a screen name) "GMFan" associated with the user who provided the query, and information included in a user profile associated with the user who provided the search query (either a copy thereof or an association with, or pointer to, the user profile) (as described with respect to query feature vector 420 of FIG. 4).

The search system 130, accesses the target corpus data store 142 and the news corpus data store 141 (e.g., operation 310 of FIG. 3) and forms document feature vectors for documents in the target corpus (i.e., target feature vectors) and the news corpus (i.e., news feature vectors) (e.g., operation 320 of FIG. 3). In some implementations, and as described above (e.g., in FIG. 3), these feature vectors may be generated by the search system 130 prior to receipt of the search query and accessed after receipt of the search query. For example, a target feature vector accessed by the search system 130 includes information related to the George Mason University web page. The target feature vector includes the document term "admissions," having a term frequency of 10, and the document term "academics," having a term frequency of 15. The target feature vector also includes a length "2 pages" of the web page, a source of the web page "www.gmu.edu" and a date "Jan. 10, 2006" on which the web page was last updated (as described with respect to document feature vector 410 of FIG. 4). Moreover, a news feature vector accessed by the search system 130 includes information related to an NCAA sports web page, and includes the document term "patriots" (which is the George Mason team name) having a term frequency of 40 and the document term "basketball," having a term frequency of 45. The news feature vector also includes a length "5 pages" of the web page, a source of the web page "www.ncaasports.com," and a date "Mar. 30, 2006" on which the web page was last updated (as described with respect to document feature vector 410 of FIG. 4).

As described above, any one of processes 500A, 500B, or 500C may be used to determine culturally relevant search results for a search query. If process 500A is performed for the search query "George Mason," the query feature vector is augmented with terms from news result feature vectors (e.g., operation 511 of FIG. 5A). In the present example, comparing the query feature vector with news feature vectors results in identification of the news result feature vector that corresponds to the NCAA sports web page described above. As such, the terms "patriots" and "basketball" from within the news result feature vector are added to the query feature vector to form the augmented query feature vector. In some implementations, information related to the terms, such as, for example, term frequency, also may be added to the augmented query feature vector.

If one of processes 500B or 500B is performed for the search "George Mason," the query feature vector is augmented with terms from a centroid of news result feature vectors (e.g., operations 522 of FIG. 5B and 533 of FIG. 5C). To determine the centroid, as described above and in some implementations, news result feature vectors are averaged (e.g., operations 521 of FIG. 5B and 532 of FIG. 5C). In the present example, comparing the query feature vector with news feature vectors (including the news feature vector for the NCAA sports web page described above) may have resulted in multiple news result feature vectors that satisfy the query feature vector, and, as such, a centroid feature vector may have been determined. The centroid feature vector may include, for example, the terms "patriots," "basketball" and "march madness." As such, these terms may be added to the query feature vector to form the augmented query feature vector.

During processes 500A and 500B, culturally relevant search results are then determined by comparing the augmented query feature vector (notwithstanding how the augmented query feature vector was generated) with target feature vectors (e.g., operations 512 of FIG. 5A and 523 of FIG. 5B). More precisely, the terms included in the augmented query feature vector ("George Mason," "patriots," and "basketball") are applied against target feature vectors to identify documents in the target corpus that satisfy both the search query "George Mason" and the current event represented by the terms "patriots" and "basketball." A target document that includes information related to the George Mason basketball team, such as, for example, an article on the web page ESPN.com is identified as satisfying the augmented query feature vector, and as such is determined to be a culturally relevant search result.

During process 500C, culturally relevant search results are determined by comparing the augmented query feature vector with temporary feature vectors determined by comparing the original query feature vector with target feature vectors (e.g., operations 530 and 534 of FIG. 5C). The original query feature vector includes the term "George Mason," and comparing this term with target documents results in identification of a temporary feature vector associated with the George Mason University web page. As described above, the augmented query feature vector (which includes the terms "George Mason," "patriots," "basketball," and "march madness") is then compared with the temporary feature vectors to determine culturally relevant search results (e.g., operation 534 of FIG. 5C). The temporary feature vectors include a subset of target feature vectors that already satisfy the search query "George Mason." By comparing the augmented query feature vector to the temporary feature vectors, that subset of target feature vectors is further narrowed to only include feature vectors for documents that satisfy both the original search query "George Mason" and the current event of the men's basketball team success in the NCAA tournament, as represented by the terms included in the augmented query feature vector. As such, a target document that includes information related to the George Mason basketball team and March Madness, such as, for example, an article on the web page ESPN.com, is identified as satisfying the augmented query feature vector, and as such is determined to be a culturally relevant search result.

During process 700, the search results determined by the search system 130 are provided to the user who entered the search query "George Mason" based on whether the determined search results have a close relationship with the original search query (e.g., search results that are related to George Mason University athletics, but not necessarily the men's basketball 2006 season) and those search results that have a close relationship with the augmented query (e.g., search results that are directly related to the 2006 men's basketball team and their NCAA performance). As such, the search results determined during processes 500A, 500B, and 500C are presented to the user by (1) boosting search results that are closely related to the current event (e.g., the NCAA tournament) to the top of a search result list (e.g., operation 741 of FIG. 7), (2) grouping search results that are closely related to the current event and grouping search results that are closely related to the original query (e.g., operation 742 of FIG. 7), and/or (3) providing all search results in a manner such that the search results that are closely related to the current event are indistinguishable from those that are closely related to the original query (e.g., operation 743 of FIG. 7).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical7 disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A computer-implemented method for providing search results to a user, the method comprising:

receiving a search query from the user, the search query being associated with a particular date and comprising a plurality of search terms;

forming, using a processor, a query feature vector for the search query, the query feature vector comprising a set of numerical values associated with the search terms;

accessing news feature vectors associated with documents related to current events, the current events documents having publication dates that are temporally proximate to the particular date, and the news feature vectors comprising sets of numerical values associated with terms in corresponding ones of the current events documents;

generating an augmented query feature vector based on the query feature vector and at least one of the news feature vectors, the generating comprising:

identifying a subset of the news feature vectors associated with at least one of the search terms and at least one of the terms within the current events documents;

generating a centroid feature vector for the subset of the news feature vectors, based on the sets of numerical values of the subset of the news feature vectors;

forming the augmented query feature vector, based on a comparison of the query feature vector and the centroid feature vector, accessing target feature vectors associated with target documents, each the target feature vectors comprising sets of numerical values associated with terms in corresponding ones of the target documents;

computing first metrics of similarity between the augmented query feature vector and the target feature vectors, the first similarity metrics comprising at least one of distances or angles between the augmented query feature vector and the target feature vectors;

identifying search results based on the computed first similarity metrics, the search results comprising information associated with at least a portion of the target documents; and enabling the user to perceive at least one of the identified search results.

2. The method of claim 1, wherein generating the augmented query feature vector comprises:

calculating, using the set of numerical values of the query feature vector and the sets of numerical values of the news feature vectors as coordinates, second metrics of similarity between the query feature vector and the news feature vectors; and selecting the subset of the news feature vectors, based on at least the second similarity metrics.

3. The method of claim 2, wherein calculating the second similarity metrics comprises calculating Euclidean distances between a point in n-dimensional space represented by the set of numerical values of the query feature vector and points in n-dimensional space represented by the sets of numerical values of the subset of the news feature vectors.

4. The method of claim 2, wherein calculating the second similarity metrics comprises calculating angles between a vector that extends to a point in n-dimensional space represented by the set of numerical values of the query feature vector and vectors that extend to points in n-dimensional space represented by the sets of numerical values of the subset of the news feature vectors.

5. The method of claim 1, wherein forming the augmented query feature vector comprises:
identifying terms within the current events documents associated with the centroid feature vector that are absent from the search query, based on at least the numerical values of the query feature vector and corresponding ones of the news feature vectors;
modifying the terms associated with the search query, the modified terms including the identified terms; and
generating, for the augmented query feature vector, a set of numerical values associated with the modified terms.

6. The method of claim 1, wherein generating the augmented query feature vector comprises:
identifying terms within the search query that are absent from the current events documents associated with the centroid feature vector, based on at least the numerical values of the query feature vector and corresponding ones of the news feature vectors;
modifying the terms associated with the search query, the modified terms excluding the identified terms; and
generating, for the augmented query feature vector, a set of numerical values associated with the modified terms.

7. The method of claim 1, wherein generating the augmented query feature vector comprises:
identifying terms within the search query that are similar to corresponding terms in the current events documents associated with the centroid feature vector;
modifying the terms associated with the search query, the modifying comprising replacing the identified terms within the similar terms from the current events documents associated with the centroid feature vector; and
generating, for the augmented query feature vector, numerical values associated with the modified terms.

8. The method of claim 1, wherein computing the first similarity metrics comprises calculating Euclidean distances between a point in n-dimensional space represented by a set of numerical values representative of the augmented query feature vector and points in n-dimensional space represented by the sets of numerical values of the target feature vectors.

9. The method of claim 2, wherein computing the first similarity metrics comprises calculating angles between a vector that extends to a point in n-dimensional space represented by a set of numerical values representative of the augmented query feature vector and vectors that extend to points in n-dimensional space represented by the sets of numerical values of the target feature vectors.

10. The method of claim 1, wherein the set of numerical values of the query feature vector represent corresponding ones of the terms submitted in the search query.

11. The method of claim 1, wherein:
the news feature vectors are associated with corresponding ones of the current events documents; and
the target feature vectors are associated with corresponding ones of the target documents.

12. The method of claim 1, wherein at least one of the current events documents was published by a news outlet less than or equal to 24 hours prior to submission of the search query by the user.

13. The method of claim 1, wherein at least one of the current events documents is associated with science and was published less than or equal to 6 months prior to submission of the search query by the user.

14. The method of claim 1, wherein at least one of the current events documents or target documents are web pages.

15. The method of claim 1, further comprising:
determining a relevance of the identified search results to the search query; and
sorting the identified search results based on the determined relevance.

16. The method of claim 1, wherein generating the centroid feature vector comprises:
calculating a weighted average of the sets of numerical values that represent the subset of the news result feature vectors; and
generating numerical values for the centroid feature vector, the numerical values comprising at least one of the weighted averages.

17. The method of claim 1, wherein generating the centroid feature vector comprises:
performing a clustering analysis of the sets of numerical values of the subset of the news feature vectors; and
generating numerical values for the centroid feature vector, based on at least the clustering analysis.

18. The method of claim 1, further comprising:
accessing a target corpus data store that references the target documents, wherein the target documents include one or more documents related to current events; and
forming the target feature vectors for the target documents from the target corpus data store.

19. The method of claim 1, further comprising:
accessing a news corpus data store that references the current events documents, wherein the current events are events related to human action; and
forming the news feature vectors for the current events documents from the news corpus data store.

20. The method of claim 1, wherein enabling the user to perceive the search results comprises:
determining a relationship between the search results and a current event at least one of the current events; and
providing the search results to the user as a perceivable list of search results organized with search results that are closely related to the current event being located in positions within the list that are above other search results.

21. The method of claim 1, wherein enabling the user to perceive the search results comprises:
distinguishing a first portion of the search results that are closely related to a current event and a second portion of the search results that have no particular known relationship with the current event; and
providing the search results to the user as a perceivable list of search results, the first search results being separated from the second search results using a label.

22. The method of claim 1, wherein generating the augmented query feature vector further comprises:
identifying first and second subsets of the news feature vectors;
generating a first centroid feature vector and a second centroid vector, the first centroid vector being associated with the first subset of the news feature vectors, and the second centroid vector being associated with the second subset of the news feature vectors; and forming the augmented query feature vector, based on a comparison of the query feature vector and the first and second centroid feature vectors.

23. The method of claim 22, wherein:
the first and second subsets are associated with at least one of the search terms;
the first subset is associated with a first term in the current events documents;
the second subset is associated with a second term in the current events documents; and
the first term is different from the second term.

24. A system for providing search results to a user, the system comprising:
means for receiving a search query from the user, the search query being associated with a particular date and comprising a plurality of search terms;
means for forming, using a processor, a query feature vector for the search query, the query feature vector comprising a set of numerical values associated with the search terms;
means for accessing news feature vectors associated with documents related to current events, the current events documents having publication dates that are temporally proximate to the particular date, and the news feature vectors comprising sets of numerical values associated with terms in corresponding ones of the current events documents;
means for generating an augmented query feature vector based on the query feature vector and the news feature vectors, the means for generating comprising:
means for identifying a subset of the news feature vectors associated with at least one of the search terms and at least one of the terms in the current events documents;
means for generating a centroid feature vector for the subset of the news feature vectors, based on the sets of numerical values of the subset of the news feature vectors;
means for forming the augmented query feature vector, based on a comparison of the query feature vector and the centroid feature vector;
means for accessing target feature vectors associated with target documents, the target feature vectors comprising sets of numerical values associated with terms in corresponding ones of the target documents;
means for computing first metrics of similarity between the augmented query feature vector and the target feature vectors, the first similarity metrics comprising at least one of distances or angles between the augmented query feature vector and the target feature vectors;
means for identifying search results based on the computed first similarity metrics, the search results comprising information associated with at least a portion of the target documents; and
means for enabling the user to perceive at least one of the identified search results.

25. A computer-implemented method for providing search results to a user, the method comprising:
receiving a search query from the user, the search query being associated with a particular date and comprising a plurality of search terms;
forming, using a processor, a query feature vector for the search query, the query feature vector comprising a set of numerical values associated with the search terms;
accessing news feature vectors associated with documents related to current events, the current events documents having publication dates that are temporally proximate to the particular date, and the news feature vectors comprising sets of numerical values associated with terms in corresponding ones of the current events documents;
identifying a subset of the news feature vectors associated with at least one of the search terms and at least one of the terms in the current events documents;
generating a centroid feature vector for the subset of the news feature vectors, based on the sets of numerical values of the subset of the news feature vectors;
accessing target feature vectors associated with target documents, the target feature vectors comprising sets of numerical values associated with terms in corresponding ones of the target documents;
computing first metrics of similarity between comparing the query feature vector with and the target feature vectors, the first similarity metrics comprising at least one of distances or angles between the query feature vector and the target feature vectors;
identifying a set of target documents as search results for the search query based on the computed first similarity metrics;
computing a second metric of similarity between the query feature vector with the centroid feature vector, the second similarity metrics comprising at least one of a distance or an angle between the query feature vector and the centroid feature vector; and
generating a signal to present a visual display of the search results to the user, the visual display visually distinguishing a subset of the set of target documents from other documents in the search results based the second similarity metric.

26. The method of claim 25, wherein computing the first similarity metrics comprises calculating Euclidean distances between a point in n-dimensional space represented by a set of numerical values representative of the query feature vector and points in n-dimensional space represented by the sets of numerical values of the target feature vectors.

27. The method of claim 25, wherein computing the first similarity metrics comprises calculating angles between a vector that extends to a point in n-dimensional space represented by a set of numerical values representative of the query feature vector and vectors that extend to points in n-dimensional space represented by the sets of numerical values of the target feature vectors.

28. The method of claim 25, wherein the numerical values of the query feature vector represent corresponding ones of the terms submitted in the search query.

29. The method of claim 25, wherein:
the news feature vectors are associated with corresponding ones of the current events documents; and
the target feature vectors are associated with corresponding ones of the target documents.

30. The method of claim 25, wherein presenting a visual display of the target documents comprises presenting a list of search results organized with search results that are closely related to the current event being located in positions within the list that are above other search results.

31. A tangible, non-transitory computer-readable medium storing instructions that, when executed by at least one processor, cause the at least one processor to perform a method, comprising:
receiving a search query from the user, the search query being associated with a particular date and comprising a plurality of search terms;

forming, using a processor, a query feature vector for the search query, the query feature vector comprising a set of numerical values associated with the search terms;

accessing news feature vectors associated with documents related to current events, the current events documents having publication dates that are temporally proximate to the particular date, and the news feature vectors comprising sets of numerical values associated with terms in corresponding ones of the current events documents;

generating an augmented query feature vector based on the query feature vector and at least one of the news feature vectors, the generating comprising:

identifying a subset of the news feature vectors associated with at least one of the search terms and at least one of the terms within the current events documents;

generating a centroid feature vector for the subset of the news feature vectors, based on the sets of numerical values of the subset of the news feature vectors;

forming the augmented query feature vector, based on a comparison of the query feature vector and the centroid feature vector;

accessing target feature vectors associated with target documents, each the target feature vectors comprising sets of numerical values associated with terms in corresponding ones of the target documents;

computing first metrics of similarity between the augmented query feature vector and the target feature vectors, the first similarity metrics comprising at least one of distances or angles between the augmented query feature vector and the target feature vectors;

identifying search results based on the computed first similarity metrics, the search results comprising information associated with at least a portion of the target documents; and enabling the user to perceive at least one of the identified search results.

\* \* \* \* \*

UNITED STATES PATENT AND TRADEMARK OFFICE
CERTIFICATE OF CORRECTION

PATENT NO.         : 8,700,619 B2
APPLICATION NO.    : 12/374657
DATED              : April 15, 2014
INVENTOR(S)        : Anthony Wiegering et al.

It is certified that error appears in the above-identified patent and that said Letters Patent is hereby corrected as shown below:

In the Claims

Claim 1, col. 18, line 47, "each the target feature vectors" should read -- each of the target feature vectors --.

Claim 25, col. 22, lines 17-19, "comparing the query feature vector with and the target feature vectors," should read -- comparing the query feature vector with the target feature vectors, --.

Signed and Sealed this
Twelfth Day of August, 2014

Michelle K. Lee
*Deputy Director of the United States Patent and Trademark Office*